(12) United States Patent
Liu et al.

(10) Patent No.: US 12,129,890 B2
(45) Date of Patent: Oct. 29, 2024

(54) INNER-SUPPORT AND GAS-FLOTATION STATIC BALANCING DEVICE FOR ROTATING RING-SHAPED PART AND METHOD OF USING THE SAME

(71) Applicant: HARBIN INSTITUTE OF TECHNOLOGY, Harbin (CN)

(72) Inventors: Zhansheng Liu, Harbin (CN); Shubo Yu, Harbin (CN); Shushan Zhang, Harbin (CN)

(73) Assignee: HARBIN INSTITUTE OF TECHNOLOGY, Harbin (CN)

(*) Notice: Subject to any disclaimer, the term of this patent is extended or adjusted under 35 U.S.C. 154(b) by 0 days.

(21) Appl. No.: 17/792,823

(22) PCT Filed: Mar. 14, 2022

(86) PCT No.: PCT/CN2022/080539
§ 371 (c)(1),
(2) Date: Jul. 14, 2022

(87) PCT Pub. No.: WO2023/123681
PCT Pub. Date: Jul. 6, 2023

(65) Prior Publication Data
US 2023/0213063 A1    Jul. 6, 2023

(30) Foreign Application Priority Data
Dec. 30, 2021    (CN) .......................... 202111669388.0

(51) Int. Cl.
*F16C 32/06*    (2006.01)
*G01M 1/12*    (2006.01)

(52) U.S. Cl.
CPC .......... *F16C 32/0622* (2013.01); *G01M 1/12* (2013.01)

(58) Field of Classification Search
CPC ... F16C 32/0622; F16C 32/0685; G01M 1/02; G01M 1/04; G01M 1/12; G01M 13/04
See application file for complete search history.

(56) References Cited

U.S. PATENT DOCUMENTS

| | | | |
|---|---|---|---|
| 1,392,028 A * | 9/1921 | Mayson | G01M 1/04 73/476 |
| 2017/0044928 A1* | 2/2017 | Tan | G01B 21/00 |
| 2017/0175584 A1* | 6/2017 | Tan | F01D 25/285 |
| 2022/0056954 A1* | 2/2022 | Liu | F16C 32/0666 |
| 2023/0213063 A1* | 7/2023 | Liu | F16C 32/0622 384/114 |

* cited by examiner

*Primary Examiner* — Alan B Waits
(74) *Attorney, Agent, or Firm* — Anthony Claiborne

(57) ABSTRACT

An inner-support and gas-flotation static balancing device for a rotating ring-shaped part and a method of using the same are provided. A bottom end of an end cover is rotatably connected to a top end of a support base. One end, which is away from a working gas cavity, of the gas-flotation chamber is connected to a disc seat through a supporting column. The levelness of the gas-flotation chamber may be adjusted through the supporting column. Two axial positioning mechanisms are respectively mounted on two sides of the gas-flotation chamber in an axis direction. Gas supplied by external air supply may enter the working gas cavity, the cylindrical gas inlet channels, and the gas inlet holes through the gas supply hole, so as to form an gas film with certain bearing capacity between the working surface and the inner surface of the rotating ring-shaped part.

19 Claims, 9 Drawing Sheets

INNER-SUPPORT AND GAS-FLOTATION STATIC BALANCING DEVICE FOR ROTATING RING-SHAPED PART AND METHOD OF USING THE SAME

CROSS REFERENCE TO RELATED APPLICATION

This application is a national stage application of International Patent Application No. PCT/CN2022/080539, filed on Mar. 14, 2022, which claims the priority of Chinese Patent Application No. 202111669388.0 entitled "HIGH-PRECISION INNER-SUPPORT AND GAS-FLOTATION STATIC BALANCING DEVICE FOR ROTATING RING-SHAPED PART AND METHOD OF USING THE SAME" filed with the Chinese Patent Office on Dec. 30, 2021, which is incorporated herein by reference in its entirety.

TECHNICAL FIELD

The present disclosure relates to a static balancing device and a method of using the same, in particular to an inner-support and gas-flotation static balancing device for a rotating ring-shaped part and a method of using the same, and belongs to the field of static balancing technology of the rotating ring-shaped part.

BACKGROUND ART

A rotating ring-shaped part (such as a gear ring and a shaft sleeve) is a part widely used in the fields such as manufacturing, navigation, aviation, aerospace. In a process of manufacturing the rotating ring-shaped part, it is inevitable to produce static unbalanced masses due to influence of factors, such as material defects and design errors. In a process that the rotating ring-shaped part rotates along with the rotation of a main shaft, these static unbalanced masses will cause abnormal vibration of a system, increase wear of the equipment, even cause catastrophic damage to the system, and seriously reduce safety and reliability of the system. A static balancing technology can reduce the static unbalanced masses of the rotating ring-shaped part and reduce vibration level of the equipment and the system, which is of great significance to improve the safety and reliability.

Since an outer surfaces of the rotating ring-shaped part, such as the gear ring and the shaft sleeve, is not cylindrical, the existing static balancing device, such as a balance guide rail and a rolling bearing swing table, cannot be directly used for static balance of the rotating ring-shaped part, and is usually used in cooperation with rotors and shaft sleeves. However, balancing precision of the rotating ring-shaped part is seriously reduced due to unbalanced masses of the rotor and the shaft sleeve, as well as a large friction torque in hard contact.

An international patent application with publication number WO 2020/224614 A1 and application number PCT/CN2020/088949, entitled "SPLIT-TYPE ADJUSTABLE-SWING-ANGLE AEROSTATIC BEARING DEVICE FOR STATIC BALANCING OF ROTOR, AND GAS-FLOTATION SUPPORT DEVICE FOR STATIC BALANCING OF ROTATING RING-SHAPED PART", particularly discloses a gas-flotation support device for static balancing of rotating ring-shaped part. However, the device has the following problems when the rotating ring-shaped part is statically balanced.

(1) A gas-flotation support structure of the gas-flotation support device adopts a single supporting mode, and the rotating ring-shaped part needs to be sleeved on the gas-flotation support device during static balance, so that the gas-flotation support device must adopt a side supporting mode. Due to a supporting mode of combining side support and single support, the existing gas-flotation static balancing device for the rotating ring-shaped part is only applicable to an occasion where the part width is short, and the rotating ring-shaped part with long width cannot be statically balanced.

(2) The gas-flotation support structure of the gas-flotation support device adopts the single supporting mode, so that the gas-flotation support device may only adjust the elevation, and cannot realize adjustment of the levelness.

(3) The adjustable ranges of the gas-flotation support structure of the gas-flotation support device and axial positioning mechanisms on two sides of the gas-flotation support device are small, so that axial positioning cannot be realized for the rotating ring-shaped part with any length.

(4) A working gas cavity in the gas-flotation supporting structure is an integral cavity, so that a curved sheet structure is formed at a top end of the gas-flotation support structure. Thus, the strength and stiffness of the gas-flotation support structure are greatly reduced, so that the existing gas-flotation static balancing device for the rotating ring-shaped part is only suitable for a light part, and cannot statically balance a heavy rotating ring-shaped part.

In conclusion, the existing gas-flotation static balancing device for the rotating ring-shaped part has the problems that it is only suitable for the occasion where the part width is short, and the rotating ring-shaped part with long width cannot be statically balanced.

SUMMARY

The objective of the present disclosure is to provide an inner-support and gas-flotation static balancing device for a rotating ring-shaped part and a method of using the same, so as to solve the problems that the existing gas-flotation static balancing device for a rotating ring-shaped part is only suitable for an occasion where the part width is short, and the rotating ring-shaped part with long width cannot be statically balanced.

The technical solution of the present disclosure is as follows.

An inner-support and gas-flotation static balancing device for a rotating ring-shaped part includes a gas-flotation chamber 1, an end cover 2, a support base 3, a supporting column 4, a disc seat 5, and two axial positioning mechanisms 6. A working gas cavity 1-2 and multiple cylindrical gas inlet channels 1-3 that communicate with the working gas cavity 1-2 are provided in the gas-flotation chamber 1. The working gas cavity 1-2 is located at a first end of the gas-flotation chamber 1. An arc-shaped working surface 1-1 is formed on a top end of the gas-flotation chamber 1. Multiple gas inlet holes 1-4 that communicate with the multiple cylindrical gas inlet channels 1-3 are formed in the working surface 1-1. The end cover 2 is fixedly mounted on an end face of the first end of the gas-flotation chamber 1 and the first end is close to the working gas cavity 1-2. The end cover 2 is in sealed connection with the working gas cavity 1-2 of the gas-flotation chamber 1. A gas supply hole 2-2 that communicates with the working gas cavity 1-2 is formed in the end cover 2. A bottom end of the end cover 2 is rotatably connected to a top end of the support base 3. A second end, which is away from the working gas cavity 1-2, of the gas-flotation chamber 1 is connected to the disc seat 5 through the supporting column 4. The two axial positioning mechanisms 6 are respectively mounted on two sides of the gas-flotation chamber 1 in an axial direction parallel to an axis of the gas-flotation chamber 1.

Further, a cross section of the working surface 1-1 may be an arc, and a central angle corresponding to the arc may be 60° to 180°.

Further, the multiple cylindrical gas inlet channels 1-3 may be arranged in a gradually sparse manner from a middle of the gas-flotation chamber to the two sides of the gas-flotation chamber 1 in a circumferential direction of the gas-flotation chamber.

Further, a sealing groove 1-5 may be formed in the end face of the first end of the gas-flotation chamber 1 and surrounds the working gas cavity 1-2. A rubber or a silicone sealing strip may be mounted in the sealing groove 1-5 and may be compressed through the end cover 2. Multiple gas-flotation chamber threaded holes 1-6 may be formed in the end face of the first end of the gas-flotation chamber 1. First cylindrical through holes 2-1 corresponding to the gas-flotation chamber threaded holes 1-6 may be formed in the end cover 2. The end cover 2 may be connected to the gas-flotation chamber 1 through the gas-flotation chamber threaded holes 1-6 and the first cylindrical through holes 2-1 by bolts.

Further, a concave hemispherical surface 1-7 may be formed in a bottom of the second end, which may be away from the working gas cavity 1-2, of the gas-flotation chamber 1. A convex hemispherical surface 4-1 matched with the hemispherical surface 1-7 may be formed in an upper end of the supporting column 4. A disc seat threaded hole 5-1 may be formed in the disc seat 5. External screw threads 4-2 matched with the disc seat threaded hole 5-1 may be formed in the supporting column 4. The supporting column 4 may be connected to the disc seat 5 through the external screw threads 4-2 and the disc seat threaded hole 5-1.

Further, a second cylindrical through hole 2-3 may be formed in a bottom end of the end cover 2. Third cylindrical through holes 3-1 having a same size as the second cylindrical through hole 2-3 may be formed in the support base 3. The end cover 2 may be connected to the support base 3 through the second cylindrical through hole 2-3 and the third cylindrical through holes 3-1 by a pin shaft.

Further, swing angles of both the end cover (2) and the support base (3) around a center of the pin shaft may be 0° to ±8°.

Further, each of the two axial positioning mechanisms 6 may include a slide rail 6-1, two spray nozzle positioning structures 6-2, and two spray nozzles 6-3. The slide rail 6-1 may be fixedly mounted at one side of the two sides of the gas-flotation chamber 1 in the axial direction. A chute may be formed in the slide rail 6-1 in a length direction of the slide rail 6-1. Each of the two spray nozzle positioning structures 6-2 may be of a cuboid structure. A mounting groove matched with the slide rail 6-1 may be formed in a first end of a corresponding one of the two spray nozzle positioning structures 6-2. The first end of the corresponding one of the two spray nozzle positioning structures 6-2 may be mounted on the slide rail 6-1 in a sliding manner. A spray nozzle mounting hole parallel to the axis of the gas-flotation chamber 1 may be formed in a second end of the corresponding one of the two spray nozzle positioning structures 6-2. A corresponding one of the two spray nozzles 6-3 may be inserted into the spray nozzle mounting hole. A locking threaded hole which vertically may communicate with the spray nozzle mounting hole may be formed in the second end of the corresponding one of the two spray nozzle positioning structures 6-2. Each of the two spray nozzles 6-3 may be connected to a corresponding one of the two spray nozzle positioning structures 6-2 through a locking screw.

Further, a diameter of the gas supply hole 2-2 may be 0.1 mm to 0.2 mm.

Further, a stop rod 5-2 may be mounted on the disc seat 5.

The present disclosure further provides a method of using an inner-support and gas-flotation static balancing device for a rotating ring-shaped part, the method includes:

placing the rotating ring-shaped part to be statically balanced on the gas-flotation chamber 1, and adjusting an elevation and a levelness of the gas-flotation chamber 1, such that the rotating ring-shaped part is located at a horizontal position;

forming a gas film with bearing capacity between the working surface 1-1 of the gas-flotation chamber 1 and an inner surface of the rotating ring-shaped part through the working gas cavity 1-2 and the gas inlet holes 1-4 by external gas supply, so as to enable the rotating ring-shaped part to float; and rotating the rotating ring-shaped part; in response to the rotating ring-shaped part being static unbalance, enabling the rotating ring-shaped part to automatically rotate until a first portion, at a phase containing an unbalance amount, of the rotating ring-shaped part reaches a lowest point to be static, de-weighting the first portion, at the phase, of the rotating ring-shaped part or weighting a second portion, at a reverse phase, of the rotating ring-shaped part; repeating above mentioned process until a random phase is at the lowest point after the rotating ring-shaped part is static, so as to complete a static balancing operation of the rotating ring-shaped part.

Compared with the prior art, the embodiments have the following effects.

1. The working surface 1-1 outside the gas-flotation chamber 1 of the embodiments is matched with the inner surface of the rotating ring-shaped part. Gas supplied by the external air supply enters the working gas cavity 1-2, and the gas forms the gas film with certain bearing capacity between the working surface 1-1 of the gas-flotation chamber 1 and the inner surface of the rotating ring-shaped part through multiple gas inlet holes 1-4. So, the rotating ring-shaped part is statically balanced after floating.

2. The inner-support and gas-flotation static balancing device for the rotating ring-shaped part provided by the embodiments may directly and statically balance the rotating ring-shaped part without the help of other rotating components, which eliminates the influence of unbalance of rotating components, such as a rotor and a shaft sleeve. Moreover, there is gas contact between the rotating ring-shaped part and the gas-flotation chamber 1, so that the friction torque is small, and the static balance precision of the rotating ring-shaped part can be greatly improved.

3. The gas-flotation chamber 1 of the embodiments adopts a double-supporting mode on both ends thereof, so that the inner-support and gas-flotation static balancing device for the rotating ring-shaped part of the embodiments may be configured for the static balance of the rotating ring-shaped part with short width, and may be configured for the static balance of the rotating ring-shaped part with long width, thereby greatly improving the universality of the static balancing device.

4. According to the embodiments, the levelness of the gas-flotation chamber may be quickly adjusted by rotating the supporting column 4. When the height of one end of the gas-flotation chamber is adjusted by rotating the supporting column 4, the gas-flotation chamber 1 and the end cover 2 rotate around the center of the pin shaft together with the support base 3, which may greatly adjust the levelness of the gas-flotation chamber and improve the static balancing efficiency.

5. The two axial positioning mechanisms 6 are respectively mounted on two sides of the gas-flotation chamber 1 of the embodiments in an axial direction parallel to an axis of the gas-flotation chamber. The slide rail 6-1 is connected and fixed to the bottom of the gas-flotation chamber 1 by bolts, and the spray nozzles 6-3 may slide in the axial direction and the vertical direction in the chute 6-1 through the respective spray nozzle positioning structures 6-2 and be adjusted to the position of the end face of the rotating ring-shaped part. Gas is sprayed from the external gas supply to the end surface of the rotating ring-shaped part through the spray nozzles 6-3. In this way, the rotating ring-shaped part is prevented from moving in the axial direction, the rotating ring-shaped parts with different width sizes may be adapted, and the universality of the static balancing device is improved.

6. The multiple cylindrical gas inlet channels 1-3 that communicate with the working gas cavity 1-2 as well as the working gas cavity 1-2 are formed in the gas-flotation chamber 1 in the embodiments. Compared with the existing gas-flotation support device, the cylindrical gas inlet channels 1-3 in the embodiments are arranged in the gas-flotation chamber 1 dispersedly, so that the strength of the gas-flotation chamber is effectively improved, the gas-flotation chamber 1 in the embodiments may be applied to a heavy part, and a heavy rotating ring-shaped part may be statically balanced. Moreover, the multiple cylindrical gas inlet channels 1-3 are arranged in a gradually sparse manner from the middle of the gas-flotation chamber to the two sides of the gas-flotation chamber in the circumferential direction of the gas-flotation chamber. There are a large number of gas inlet holes 1-4 in the working surface 1-1 of the gas-flotation chamber 1, which can improve the bearing capacity in the embodiments.

Figure 1:
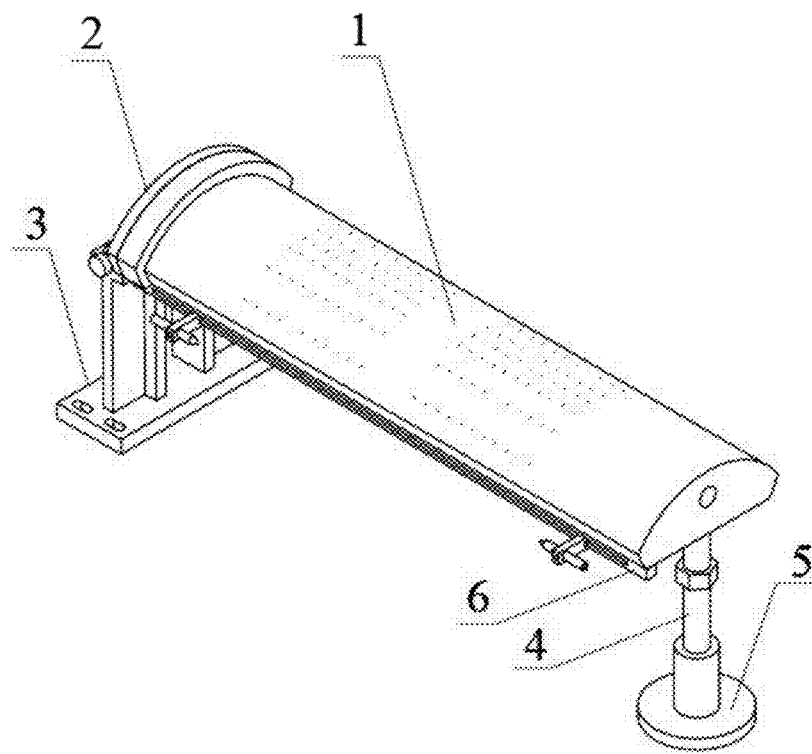
FIG. 1 illustrates an axonometric view of an inner-support and gas-flotation static balancing device for a rotating ring-shaped part according to an embodiment 1 of the present disclosure.

List of the reference characters: 1 gas-flotation chamber; 1-1 working surface; 1-2 working gas cavity; 1-3 cylindrical gas inlet channel; 1-4 gas inlet hole; 1-5 sealing groove; 1-6 gas-flotation chamber threaded hole; 1-7 hemispherical surface; 2 end cover; 2-1 first cylindrical through hole; 2-2 gas supply hole; 2-3 second cylindrical through hole; 3 support base; 3-1 third cylindrical through hole; 4 supporting column; 4-1 convex hemispherical surface; 4-2 external screw threads; 5 disc seat; 5-1 disc seat threaded hole; 5-2 stop rod; 6 axial positioning mechanism; 6-1 slide rail; 6-2 spray nozzle positioning structure; and 6-3 spray nozzle.

DETAILED DESCRIPTION OF THE EMBODIMENTS

Embodiment 1: the present embodiment is described in combination with FIG. 1 to FIG. 10. According to the present embodiment, an inner-support and gas-flotation static balancing device for a rotating ring-shaped part includes an gas-flotation chamber 1, an end cover 2, a support base 3, a supporting column 4, a disc seat 5, and two axial positioning mechanisms 6. A working gas cavity 1-2 and multiple cylindrical gas inlet channels 1-3 that communicate with the working gas cavity 1-2 are provided in the gas-flotation chamber 1. The working gas cavity 1-2 is located at a first end of the gas-flotation chamber 1. An arc-shaped working surface 1-1 is formed at a top end of the gas-flotation chamber 1. Multiple gas inlet holes 1-4 that communicate with the multiple cylindrical gas inlet channels 1-3 are formed in the working surface 1-1. A curvature of the working surface 1-1 of the gas-flotation chamber 1 is the same as that of an inner ring of the rotating ring-shaped part. The end cover 2 is fixedly arranged on an end face of first end of the gas-flotation chamber 1, and the first end is close to the working gas cavity 1-2. The end cover 2 is in sealed connection with the working gas cavity 1-2 of the gas-flotation chamber 1. An gas supply hole 2-2 that communicates with the working gas cavity 1-2 is formed in the end cover 2. A bottom end of the end cover 2 is rotatably connected to a top end of the support base 3. A second end, which is away from the working gas cavity 1-2, of the gas-flotation chamber 1 is connected to the disc seat 5 through the supporting column 4. A levelness of the gas-flotation chamber 1 may be adjusted through the supporting column 4. The two axial positioning mechanisms 6 are respectively mounted on two sides of the gas-flotation chamber 1 in a axial direction parallel to an axis of the gas-flotation chamber 1. In a working state, externally supplied gas may enter the working gas cavity 1-2, the cylindrical gas inlet channels 1-3, and the gas inlet holes 1-4 through the gas supply hole 2-2, and thus a gas film with bearing capacity is formed between the working surface 1-1 and the inner surface of the rotating ring-shaped part. So, the rotating ring-shaped part floats to be statically balanced.

Figure 3:
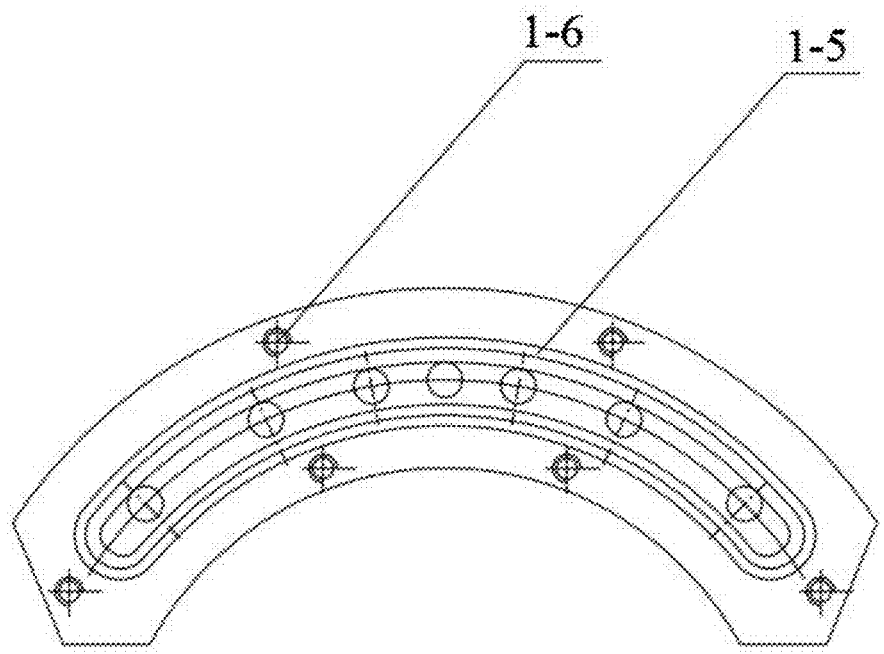
FIG. 3 illustrates a side view of the gas-flotation chamber according to an embodiment of the present disclosure.

Embodiment 2: the present embodiment is described in combination with FIG. 1 and FIG. 3. According to the present embodiment, a cross section of the working surface 1-1 is an arc, and a central angle corresponding to the arc is 60° to 180°. Other components and connection relationships are the same as those of Embodiment 1.

Figure 2:
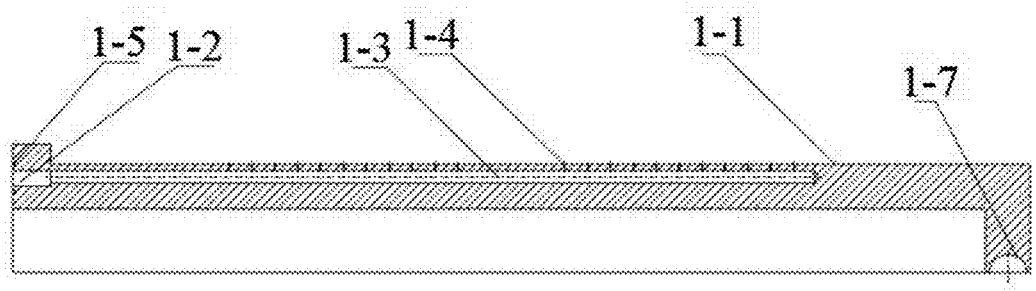
FIG. 2 illustrates a sectional view of a gas-flotation chamber according to an embodiment of the present disclosure.

Embodiment 3: the present embodiment is described in combination with FIG. 1 and FIG. 2. According to the present embodiment, the multiple cylindrical gas inlet channels (1-3) are arranged in a gradually sparse manner from a middle of the gas-flotation chamber to the two sides of the gas-flotation chamber 1. Through such arrangement, there are a large number of gas inlet holes 1-4 in the top of the working surface 1-1 of the gas-flotation chamber 1, which can improve the bearing capacity in the embodiment. Other components and connection relationships are the same as those of Embodiment 1 or Embodiment 2.

Figure 4:
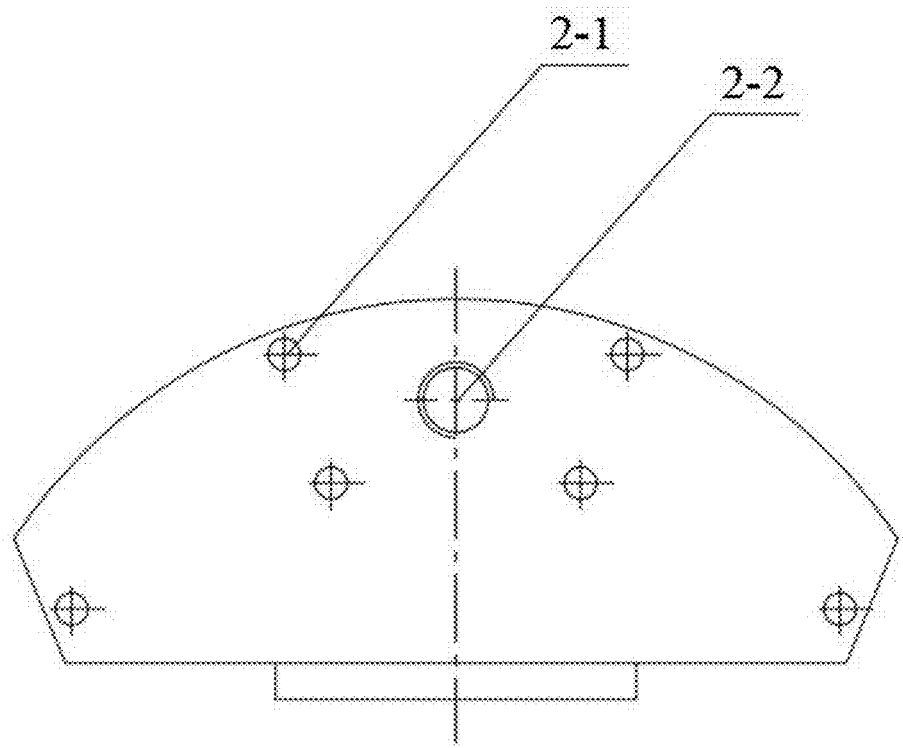
FIG. 4 illustrates a front view of an end cover according to an embodiment of the present disclosure.

Embodiment 4: the present embodiment is described in combination with FIG. 1, FIG. 3, and FIG. 4. According to the present embodiment, a sealing groove 1-5 is formed in the end face of the first end of the gas-flotation chamber 1 and surrounds the working gas cavity 1-2. A rubber or a silicone sealing strip is mounted in the sealing groove 1-5. The rubber or the silicone sealing strip is compressed through the end cover 2. Multiple gas-flotation chamber threaded holes 1-6 are formed in the end face of the first end of the gas-flotation chamber 1. First cylindrical through holes 2-1 corresponding to the gas-flotation chamber threaded holes 1-6 are formed in the end cover 2. The end cover 2 is connected to the gas-flotation chamber 1 through the gas-flotation chamber threaded holes 1-6 and the first cylindrical through holes 2-1 by bolts. Through such arrangement, the gas-flotation chamber 1 is connected to the end cover 2 by bolts, which facilitates the assembly of a part and the replacement of the rubber or silicone sealing strip. Other components and connection relationships are the same as those of Embodiment 1, 2, or 3.

Figure 7:
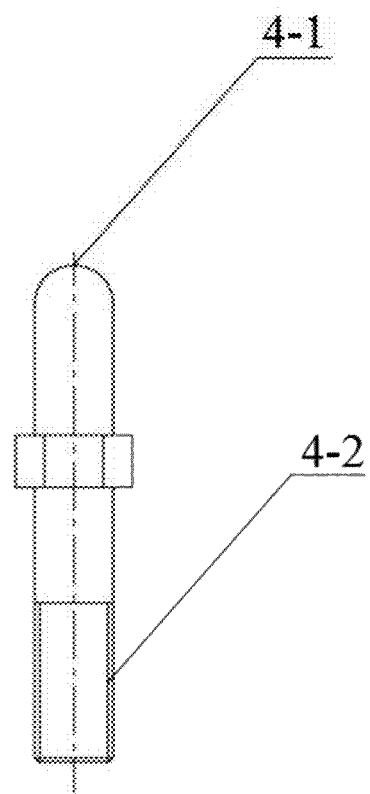
FIG. 7 illustrates a front view of a supporting column according to an embodiment of the present disclosure.
Figure 8:
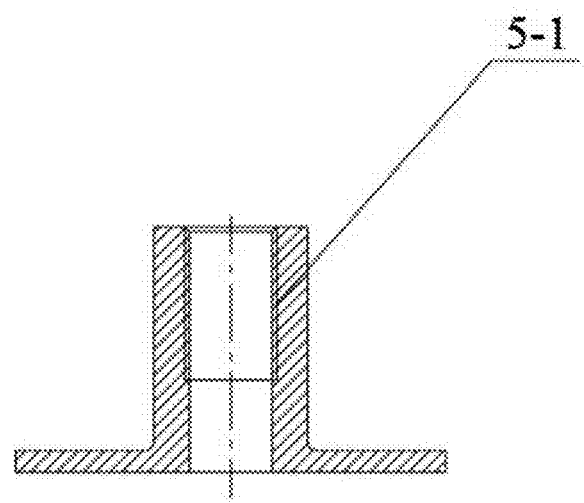
FIG. 8 illustrates a sectional view of a disc seat according to an embodiment 5 of the present disclosure.
Figure 9:
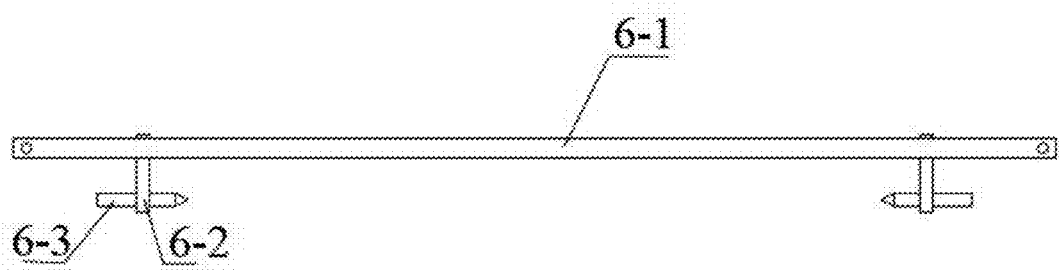
FIG. 9 illustrates a front view of an axial positioning mechanism according to an embodiment of the present disclosure.
Figure 10:
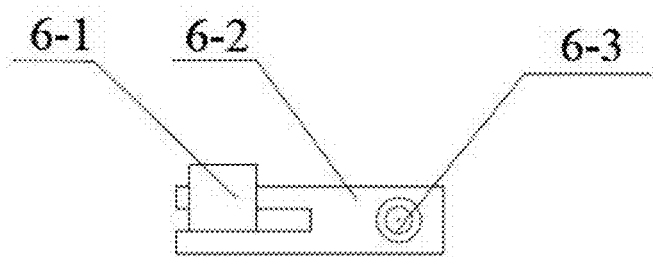
FIG. 10 illustrates a side view of the axial positioning mechanism according to an embodiment of the present disclosure.
Figure 11:
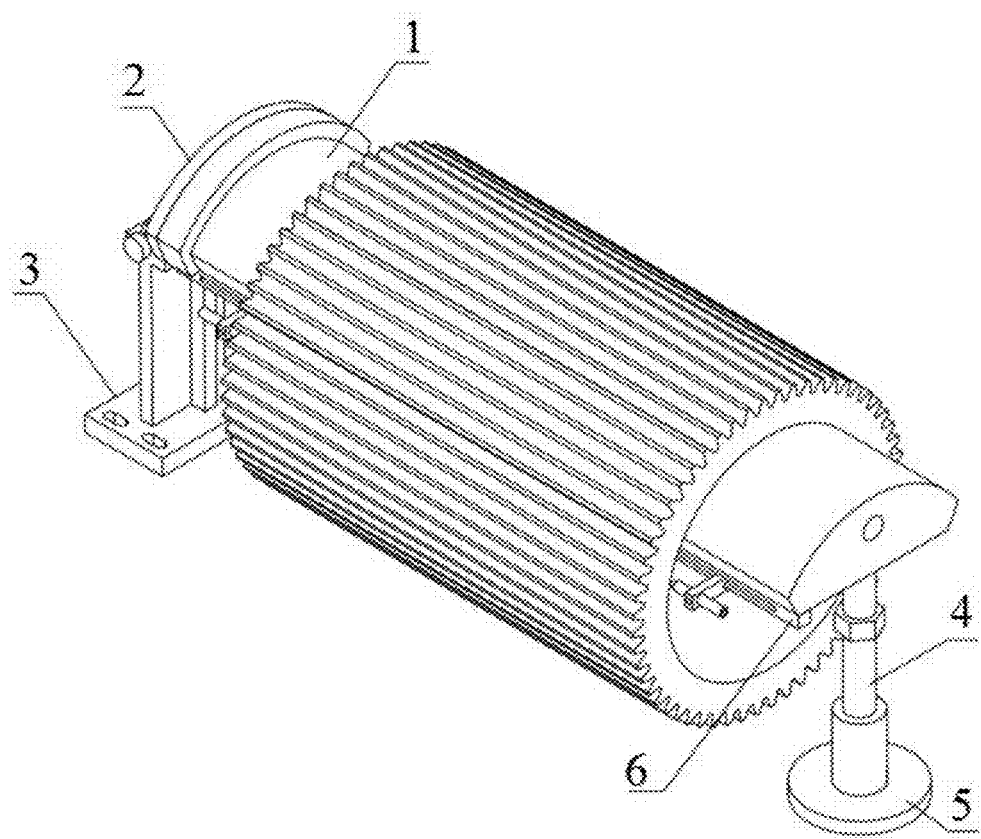
FIG. 11 illustrates a schematic structural diagram of statically balancing the rotating ring-shaped part by the inner-support and gas-flotation static balancing device for the rotating ring-shaped part according to the embodiment 5 of the present disclosure.

Embodiment 5: the present embodiment is described in combination with FIG. 2, FIG. 7, and FIG. 8. According to the present embodiment, a concave hemispherical surface 1-7 is formed in a bottom of the second end, which is away from the working gas cavity 1-2, of the gas-flotation chamber 1. A convex hemispherical surface 4-1 matched with the hemispherical surface 1-7 is formed in an upper end of the supporting column 4. A disc seat threaded hole 5-1 is formed in the disc seat 5. External screw threads 4-2 matched with the disc seat threaded hole 5-1 are formed in the supporting column 4. The supporting column 4 is connected to the disc seat 5 through the external screw threads 4-2 and the disc seat threaded hole 5-1. Through such arrangement, the levelness of the gas-flotation chamber may be quickly adjusted by rotating the supporting column 4, so as to improve the static balancing efficiency. Other components and connection relationships are the same as those of Embodiment 1, 2, 3, or 4.

Figure 5:
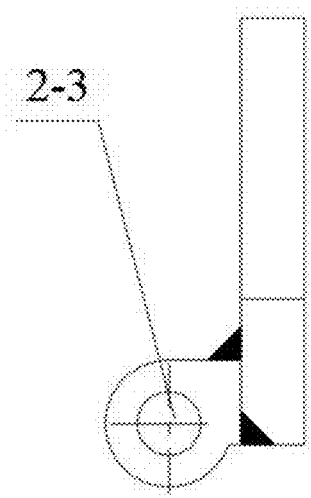
FIG. 5 illustrates a side view of the end cover according to an embodiment of the present disclosure.
Figure 6:
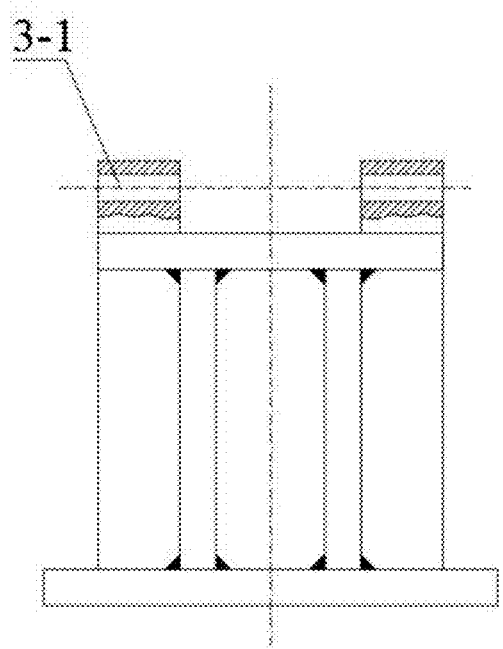
FIG. 6 illustrates a front view of a support base according to an embodiment of the present disclosure.

Embodiment 6: the present embodiment is described in combination with FIG. 4, FIG. 5, and FIG. 6. According to the present embodiment, a second cylindrical through hole 2-3 is formed in a bottom end of the end cover 2. Third cylindrical through holes 3-1 having a same size as the second cylindrical through hole 2-3 are formed in the support base 3. The end cover 2 is connected to the support base 3 through the second cylindrical through hole 2-3 and the third cylindrical through holes 3-1 by a pin shaft. Through such arrangement, the gas-flotation chamber 1 and the end cover 2 rotate around a center of the pin shaft together with the support base 3 when the height of the second end of the gas-flotation chamber is adjusted by rotating the supporting column 4, so that the levelness of the gas-flotation chamber 1 is quickly adjusted. Other components and connection relationships are the same as those of Embodiment 1, 2, 3, 4, or 5.

Embodiment 7: the present embodiment is described in combination with FIG. 1 to FIG. 10. According to the present embodiment, swing angles of both the end cover 2 and the support base 3 around a center of the pin shaft are 0° to +8°. Other components and connection relationships are the same as those of Embodiment 1, 2, 3, 4, 5, or 6.

Embodiment 8: the present embodiment is described in combination with FIG. 1. According to the present embodiment, each of the two axial positioning mechanisms 6 includes a slide rail 6-1, two spray nozzle positioning structures 6-2, and two spray nozzles 6-3. The slide rail 6-1 is fixedly mounted at one side of the two sides of the gas-flotation chamber 1 in the axial direction; a chute is formed in the slide rail 6-1 in a length direction of the slide rail 6-1. Each of the two spray nozzle positioning structures 6-2 is of a cuboid structure. A mounting groove matched with the slide rail 6-1 is formed in a first end of a corresponding one of the two spray nozzle positioning structures 6-2. The first end of the corresponding one of the two spray nozzle positioning structures 6-2 is mounted on the slide rail 6-1 in a sliding manner. A spray nozzle mounting hole parallel to the axis of the gas-flotation chamber 1 is formed in a second end of the corresponding one of the two spray nozzle positioning structures 6-2. A corresponding one of the two spray nozzles 6-3 is inserted into the spray nozzle mounting hole. A locking threaded hole which vertically communicates with the spray nozzle mounting hole is formed in the second end of the corresponding one of the two spray nozzle positioning structures 6-2. Each of the two spray nozzles 6-3 is connected to a corresponding one of the two spray nozzle positioning structures 6-2 through a locking screw. Through such arrangement, the slide rail 6-1 is connected and fixed to the bottom of the gas-flotation chamber 1 by bolts, and the spray nozzles 6-3 may slide in the slide rail 6-1 along an axial direction and an vertical direction of the slide rail 6-1 through the respective spray nozzle positioning structures 6-2 and be adjusted to positions of end faces of the rotating ring-shaped part. Gas is sprayed from the external gas supply to the end faces of the rotating ring-shaped part through the spray nozzles 6-3, so that the rotating ring-shaped part is prevented from moving in the axial direction of the gas-flotation chamber 1. Other components and connection relationships are the same as those of Embodiment 1, 2, 3, 4, 5, 6, or 7.

Embodiment 9: the present embodiment is described in combination with FIG. 1 and FIG. 2. According to the present embodiment, a diameter of the gas supply hole 2-2 is 0.1 mm to 0.2 mm. Through such arrangement, the gas supply hole 2-2 is formed in the working surface 1-1 of the gas-flotation chamber 1. Compared with the exiting throttling orifice, the present embodiment facilitates machining better, and improves the machining efficiency. Other components and connection relationships are the same as those of Embodiment 1, 2, 3, 4, 5, 6, 7, or 8.

Figure 12:
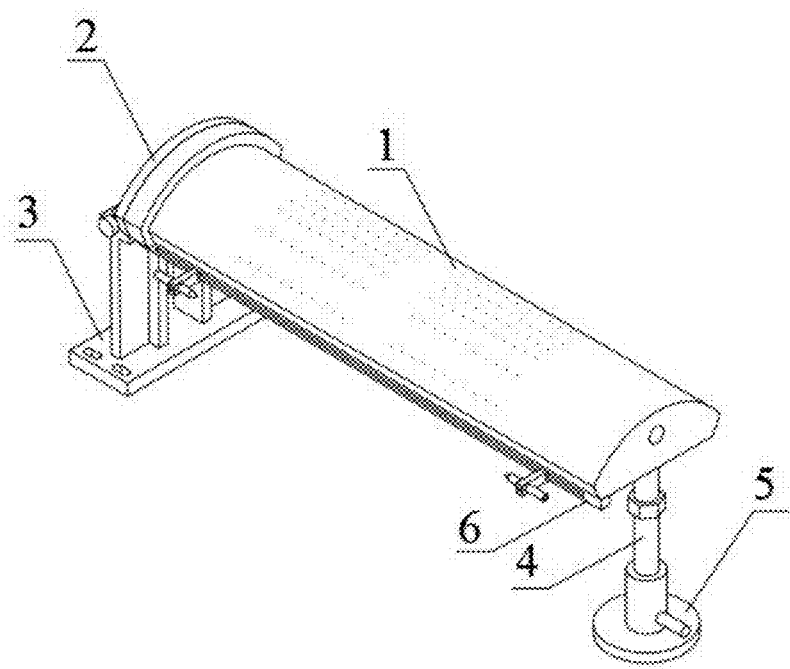
FIG. 12 illustrates an axonometric drawing of the inner-support and gas-flotation static balancing device for the rotating ring-shaped ring part according to an embodiment 10 of the present disclosure.
Figure 13:
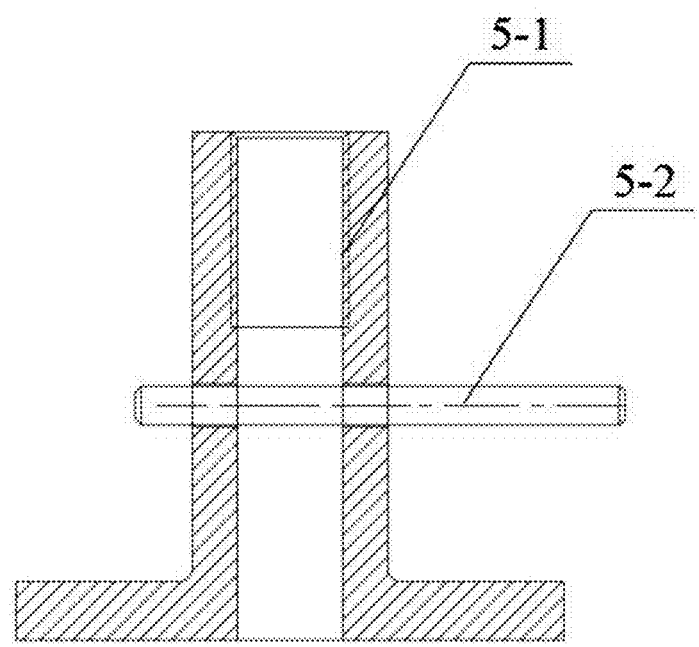
FIG. 13 illustrates a sectional view of a disc seat according to an embodiment 11 of the present disclosure.
Figure 14:
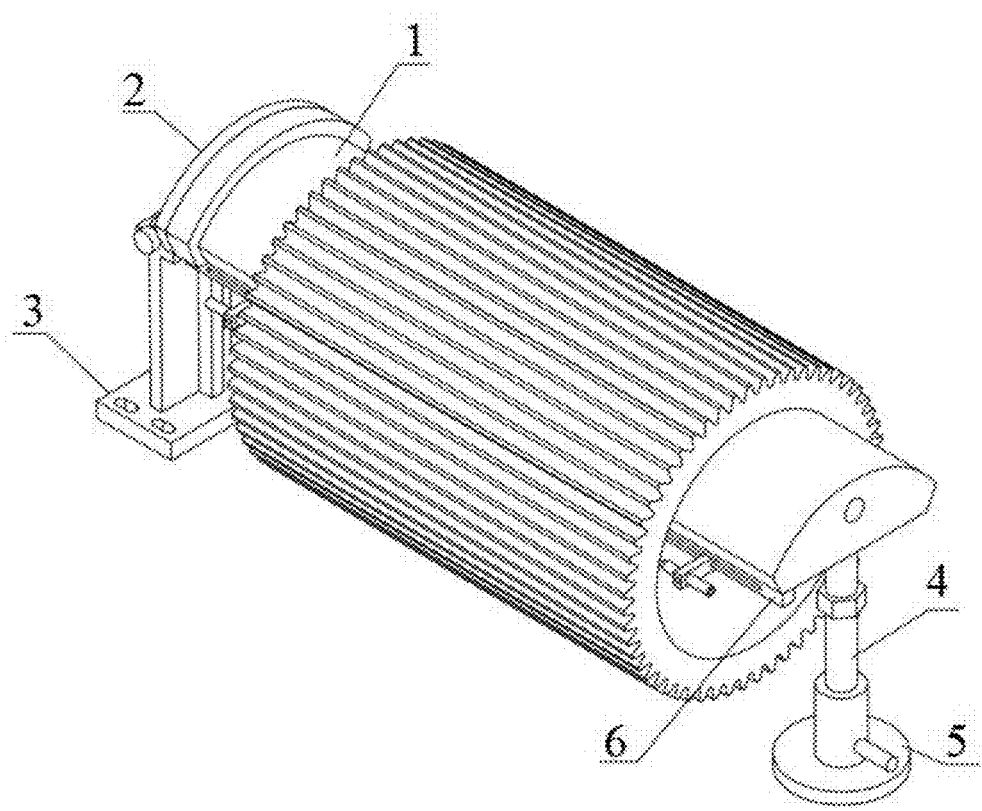
FIG. 14 illustrates a schematic structural diagram of statically balancing the rotating ring-shaped part by the inner-support and gas-flotation static balancing device for the rotating ring-shaped part according to the embodiment 10 of the present disclosure.

Embodiment 10: the present embodiment is described in combination with FIG. 12 and FIG. 13. The difference between the present embodiment and Embodiment 5 is that, according to the present embodiment, a stop rod 5-2 is mounted on the disc seat 5. The levelness of the gas-flotation chamber may be adjusted by rotating the supporting column 4, and the stop rod 5-2 may prevent the disc seat 5 from rotating during the process of adjusting the levelness. Specifically, the stop rod 5-2 is vertically mounted at the lower part of the disc seat 5 in a penetrating manner, and the stop rod 5-2 is located below the disc seat threaded hole 5-1.

The present embodiment further provides a method using an inner-support and gas-flotation static balancing device for a rotating ring-shaped part, which includes the following steps S1-S3.

In S1, the rotating ring-shaped part to be statically balanced is placed on the gas-flotation chamber 1, and an elevation and the levelness of the gas-flotation chamber 1 are adjusted, so that the rotating ring-shaped part is located at a horizontal position.

In S2, a gas film with bearing capacity is formed between the working surface 1-1 of the gas-flotation chamber 1 and an inner surface of the rotating ring-shaped part through the working gas cavity 1-2 and the gas inlet holes 1-4 by external gas supply, so as to enable the rotating ring-shaped part to float.

In S3, the rotating ring-shaped part is rotated. In response to the rotating ring-shaped part being static unbalance, the rotating ring-shaped part automatically rotates until a first portion, at a phase containing an unbalance amount, of the rotating ring-shaped part reaches a lowest point to be static, the first portion, at the phase, of the rotating ring-shaped part is de-weighted, or a second portion, at a reverse phase, of the rotating ring-shaped part, is weighted. The above mentioned process is repeated until a random phase is at the lowest point after the rotating ring-shaped part is stationary, so as to complete a static balancing operation of the rotating ring-shaped part.

Working Principle

The working principle of the inner-support and gas-flotation static balancing device for the rotating ring-shaped part of the present disclosure is described in combination with FIG. 1 to FIG. 14.

Firstly, the support base 3 of the inner-support and gas-flotation static balancing device for the rotating ring-shaped part is fixed to a mounting platform. The end cover 2 on the first end of the gas-flotation chamber 1 is rotatably connected to the support base 3 through the pin shaft, and the rotating ring-shaped part, which is to be subjected to static balancing detection, is placed on the gas-flotation chamber 1, so that the working surface 1-1 on the gas-flotation chamber 1 is in contact with the inner surface of the rotating ring-shaped part.

Secondly, the disc seat 5 is placed on the mounting platform. A lower end of the supporting column 4 is screwed on the disc seat 5. The stop rod 5-2 is mounted on the disc seat. The convex hemispherical surface 4-1 on an upper end of the supporting column 4 is mounted in the concave hemispherical surface 1-7 on the second end of the gas-flotation chamber 1. The levelness of the gas-flotation chamber is quickly adjusted by rotating the supporting column 4, and the stop rod 5-2 may prevent the disc seat 5 from rotating in a process of adjusting the levelness. Specifically, the stop rod 5-2 is pressed and the supporting column 4 is rotated during working.

Thirdly, the positions of the spray nozzles 6-3 in the axial positioning mechanisms 6 are adjusted according to width sizes of the rotating ring-shaped part to be subjected to static balancing detection. A distance between each spray nozzle 6-3 and a corresponding one of the end faces of the rotating ring-shaped part to be subjected to the static balancing detection is adjusted. Gas is sprayed from the external gas supply to the end faces of the rotating ring-shaped part through the spray nozzles 6-3, so that the rotating ring-shaped part is prevented from moving in the axial direction of the gas-flotation chamber.

Finally, gas with a certain pressure enters the working gas cavity 1-2, the cylindrical gas inlet channels 1-3, and the gas inlet holes 1-4 through the gas supply hole 2-2, so as to form the gas film with the certain bearing capacity between the working surface 1-1 of the gas-flotation chamber 1 and the inner surface of the rotating ring-shaped part, thereby enabling the rotating ring-shaped part to float to be statically balanced.

The above embodiments are merely used to illustrate the technical solutions of the present disclosure, and are not intended to limit the present disclosure. Although the present disclosure has been described in detail with reference to the foregoing embodiments, those of ordinary skill in the art should understand that the technical solutions described in the foregoing embodiments are modified, or some technical features are equivalently replaced. However, these modifications and replacements do not make the essence of the corresponding technical solutions depart from the spirit and scope of the technical solutions of various embodiments of the present disclosure.

What is claimed is:

1. An inner-support and gas-flotation static balancing device for a rotating ring-shaped part, the device comprising a gas-flotation chamber (1), an end cover (2), a support base (3), a supporting column (4), a disc seat (5), and two axial positioning mechanisms (6), wherein a working gas cavity (1-2) and a plurality of cylindrical gas inlet channels (1-3) that communicate with the working gas cavity (1-2) are provided in the gas-flotation chamber (1); the working gas cavity (1-2) is located at a first end of the gas-flotation chamber (1); an arc-shaped working surface (1-1) is formed on a top end of the gas-flotation chamber (1); a plurality of gas inlet holes (1-4) that communicate with the plurality of cylindrical gas inlet channels (1-3) are formed in the working surface (1-1); the end cover (2) is fixedly mounted on an end face of the first end of the gas-flotation chamber (1), and the first end is adjacent to the working gas cavity (1-2); the end cover (2) is in sealed connection with the working gas cavity (1-2) of the gas-flotation chamber (1); a gas supply hole (2-2) that communicates with the working gas cavity (1-2) is formed in the end cover (2); a bottom end of the end cover (2) is rotatably connected to a top end of the support base (3); a second end, which is away from the working gas cavity (1-2), of the gas-flotation chamber (1) is connected to the disc seat (5) through the supporting column (4); and the two axial positioning mechanisms (6) are respectively mounted on two sides of the gas-flotation chamber (1) in an axial direction parallel to an axis of the gas-flotation chamber (1).

2. The inner-support and gas-flotation static balancing device for the rotating ring-shaped part according to claim 1, wherein a cross section of the working surface (1-1) is an arc, and a central angle corresponding to the arc is 60° to 180°.

3. The inner-support and gas-flotation balancing device for the rotating ring-shaped part according to claim 2, wherein the plurality of cylindrical gas inlet channels (1-3) are arranged from a middle of the gas-flotation chamber to the two sides of the gas-flotation chamber (1) in a circumferential direction of the gas-flotation chamber.

4. The inner-support and gas-flotation balancing device for the rotating ring-shaped part according to claim 1, wherein the plurality of cylindrical gas inlet channels (1-3) are arranged from a middle of the gas-flotation chamber to the two sides of the gas-flotation chamber (1) in a circumferential direction of the gas-flotation chamber.

5. The inner-support and gas-flotation static balancing device for the rotating ring-shaped part according to claim 4, wherein a sealing groove (1-5) is formed in the end face of the first end of the gas-flotation chamber (1) and surrounds the working gas cavity (1-2); a rubber or a silicone sealing strip is mounted in the sealing groove (1-5) and is compressed through the end cover (2); a plurality of gas-flotation chamber threaded holes (1-6) are formed in the end face of the first end of the gas-flotation chamber (1); first cylindrical through holes (2-1) corresponding to the gas-flotation chamber threaded holes (1-6) are formed in the end cover (2); and the end cover (2) is connected to the gas-flotation chamber (1) through the gas-flotation chamber threaded holes (1-6) and the first cylindrical through holes (2-1) by bolts.

6. The inner-support and gas-flotation static balancing device for the rotating ring-shaped part according to claim 5, wherein a concave hemispherical surface (1-7) is formed in a bottom of the second end, which is away from the working gas cavity (1-2), of the gas-flotation chamber (1); a convex hemispherical surface (4-1) matched with the hemispherical surface (1-7) is formed in an upper end of the supporting column (4); a disc seat threaded hole (5-1) is formed in the disc seat (5); external screw threads (4-2) matched with the disc seat threaded hole (5-1) are formed in the supporting column (4); and the supporting column (4) is connected to the disc seat (5) through the external screw threads (4-2) and the disc seat threaded hole (5-1).

7. The inner-support and gas-flotation static balancing device for the rotating ring-shaped part according to claim 6, wherein a stop rod (5-2) is mounted on the disc seat (5).

8. The inner-support and gas-flotation static balancing device for the rotating ring-shaped part according to claim 6, wherein a second cylindrical through hole (2-3) is formed in a bottom end of the end cover (2); third cylindrical through holes (3-1) having a same size as the second cylindrical through hole (2-3) are formed in the support base (3); and the end cover (2) is connected to the support base (3) through the second cylindrical through hole (2-3) and the third cylindrical through holes (3-1) by a pin shaft.

9. The inner-support and gas-flotation static balancing device for the rotating ring-shaped part according to claim 8, wherein each of the two axial positioning mechanisms (6) comprises a slide rail (6-1), two spray nozzle positioning structures (6-2), and two spray nozzles (6-3); the slide rail (6-1) is fixedly mounted at one side of the two sides of the gas-flotation chamber (1) in the axial direction; a chute is formed in the slide rail (6-1) in a length direction of the slide rail (6-1); each of the two spray nozzle positioning structures (6-2) is of a cuboid structure; a mounting groove matched with the slide rail (6-1) is formed in a first end of a corresponding one of the two spray nozzle positioning structures (6-2); the first end of the corresponding one of the two spray nozzle positioning structures (6-2) is mounted on the slide rail (6-1) in a sliding manner; a spray nozzle mounting hole parallel to the axis of the gas-flotation chamber (1) is formed in a second end of the corresponding one of the two spray nozzle positioning structures (6-2); a corresponding one of the two spray nozzles (6-3) is inserted into the spray nozzle mounting hole; a locking threaded hole which vertically communicates with the spray nozzle mounting hole is formed in the second end of the corresponding one of the two spray nozzle positioning structures (6-2); and each of the two spray nozzles (6-3) is connected to a corresponding one of the two spray nozzle positioning structures (6-2) through a locking screw.

10. The inner-support and gas-flotation static balancing device for the rotating ring-shaped part according to claim 8, wherein swing angles of both the end cover (2) and the support base (3) around a center of the pin shaft are 0° to ±8°.

11. The inner-support and gas-flotation static balancing device for the rotating ring-shaped part according to claim 1, wherein each of the two axial positioning mechanisms (6) comprises a slide rail (6-1), two spray nozzle positioning structures (6-2), and two spray nozzles (6-3); the slide rail (6-1) is fixedly mounted at one side of the two sides of the gas-flotation chamber (1) in the axial direction; a chute is formed in the slide rail (6-1) in a length direction of the slide rail (6-1); each of the two spray nozzle positioning structures (6-2) is of a cuboid structure; a mounting groove matched with the slide rail (6-1) is formed in a first end of a corresponding one of the two spray nozzle positioning structures (6-2); the first end of the corresponding one of the two spray nozzle positioning structures (6-2) is mounted on the slide rail (6-1) in a sliding manner; a spray nozzle mounting hole parallel to the axis of the gas-flotation chamber (1) is formed in a second end of the corresponding one of the two spray nozzle positioning structures (6-2); a corresponding one of the two spray nozzles (6-3) is inserted into the spray nozzle mounting hole; a locking threaded hole which vertically communicates with the spray nozzle mounting hole is formed in the second end of the corresponding one of the two spray nozzle positioning structures (6-2); and each of the two spray nozzles (6-3) is connected to a corresponding one of the two spray nozzle positioning structures (6-2) through a locking screw.

12. The inner-support and gas-flotation static balancing device for the rotating ring-shaped part according to claim 11, wherein a diameter of the gas supply hole (2-2) is 0.1 mm to 0.2 mm.

13. A method of using an inner-support and gas-flotation static balancing device for a rotating ring-shaped part, the device comprising a gas-flotation chamber (1), an end cover (2), a support base (3), a supporting column (4), a disc seat (5), and two axial positioning mechanisms (6), wherein a working gas cavity (1-2) and a plurality of cylindrical gas inlet channels (1-3) that communicate with the working gas cavity (1-2) are provided in the gas-flotation chamber (1); the working gas cavity (1-2) is located at a first end of the gas-flotation chamber (1); an arc-shaped working surface (1-1) is formed on a top end of the gas-flotation chamber (1); a plurality of gas inlet holes (1-4) that communicate with the plurality of cylindrical gas inlet channels (1-3) are formed in the working surface (1-1); the end cover (2) is fixedly mounted on an end face of the first end of the gas-flotation chamber (1) and the first end is adjacent to the working gas cavity (1-2); the end cover (2) is in sealed connection with the working gas cavity (1-2) of the gas-flotation chamber (1); a gas supply hole (2-2) that communicates with the working gas cavity (1-2) is formed in the end cover (2); a bottom end of the end cover (2) is rotatably connected to a top end of the support base (3); a second end, which is away from the working gas cavity (1-2), of the gas-flotation chamber (1) is connected to the disc seat (5) through the supporting column (4); and the two axial positioning mechanisms (6) are respectively mounted on two sides of the gas-flotation chamber (1) in an axial direction parallel to an axis of the gas-flotation chamber (1);

the method comprising:
placing the rotating ring-shaped part to be statically balanced on the gas-flotation chamber (1), and adjusting an elevation and a levelness of the gas-flotation chamber (1), such that the rotating ring-shaped part is located at a horizontal position;
forming a gas film with bearing capacity between the working surface (1-1) of the gas-flotation chamber (1) and an inner surface of the rotating ring-shaped part through the working gas cavity (1-2) and the gas inlet holes (1-4) by external gas supply, so as to enable the rotating ring-shaped part to float;
allowing the rotating ring-shaped part to rotate from a statically unbalanced position to a balanced position at a phase in which a first portion containing an unbalanced amount is at a lowest point, then either deweighting the first portion or weighting a second portion at a reverse phase to the first portion; and
repeating the step of allowing the rotating ring-shaped part to rotate until a random phase is at the lowest point after the rotating ring-shaped part is static, so as to complete a static balancing operation of the rotating ring-shaped part.

14. The method according to claim 13, wherein a cross section of the working surface (1-1) is an arc, and a central angle corresponding to the arc is 60° to 180°.

15. The method according to claim 13, wherein the plurality of cylindrical gas inlet channels (1-3) are arranged from a middle of the gas-flotation chamber to the two sides of the gas-flotation chamber (1) in a circumferential direction of the gas-flotation chamber.

16. The method according to claim 15, wherein a sealing groove (1-5) is formed in the end face of the first end of the gas-flotation chamber (1) and surrounds the working gas cavity (1-2); a rubber or a silicone sealing strip is mounted in the sealing groove (1-5) and is compressed through the end cover (2); a plurality of gas-flotation chamber threaded holes (1-6) are formed in the end face of the first end of the gas-flotation chamber (1); first cylindrical through holes (2-1) corresponding to the gas-flotation chamber threaded holes (1-6) are formed in the end cover (2); and the end cover (2) is connected to the gas-flotation chamber (1) through the gas-flotation chamber threaded holes (1-6) and the first cylindrical through holes (2-1) by bolts.

17. The method according to claim 16, wherein a concave hemispherical surface (1-7) is formed in a bottom of the second end, which is away from the working gas cavity (1-2), of the gas-flotation chamber (1); a convex hemispherical surface (4-1) matched with the hemispherical surface (1-7) is formed in an upper end of the supporting column (4); a disc seat threaded hole (5-1) is formed in the disc seat (5); external screw threads (4-2) matched with the disc seat threaded hole (5-1) are formed in the supporting column (4); and the supporting column (4) is connected to the disc seat (5) through the external screw threads (4-2) and the disc seat threaded hole (5-1).

18. The method according to claim 17, wherein a second cylindrical through hole (2-3) is formed in a bottom end of the end cover (2); third cylindrical through holes (3-1) having a same size as the second cylindrical through hole (2-3) are formed in the support base (3); and the end cover (2) is connected to the support base (3) through the second cylindrical through hole (2-3) and the third cylindrical through holes (3-1) by a pin shaft.

19. The method according to claim 18, wherein swing angles of both the end cover (2) and the support base (3) around a center of the pin shaft are 0° to ±8°.

\* \* \* \* \*